United States Patent [19]

Siemensmeyer

[11] Patent Number: 4,989,999
[45] Date of Patent: Feb. 5, 1991

[54] EMPTY-CENTER ROTATING-ROLLER JOINT

[75] Inventor: Heinrich Siemensmeyer, Dortmund, Fed. Rep. of Germany

[73] Assignee: Hoesch Aktiengesellschaft, Dortmund, Fed. Rep. of Germany

[21] Appl. No.: 478,621

[22] Filed: Feb. 12, 1990

[30] Foreign Application Priority Data

Mar. 23, 1989 [DE] Fed. Rep. of Germany ....... 3909664
Dec. 23, 1989 [DE] Fed. Rep. of Germany ....... 3942847

[51] Int. Cl.$^5$ ............................................. F16C 33/61
[52] U.S. Cl. ................................... 384/455; 384/569; 384/620; 384/622
[58] Field of Search ............... 384/455, 569, 621, 620, 384/622

[56] References Cited

U.S. PATENT DOCUMENTS 4,828,405  5/1989  Sinner .................................. 384/622
4,861,171  8/1989  Adachi .............................. 384/455

*Primary Examiner*—Lenard A. Footland
*Attorney, Agent, or Firm*—Max Fogiel

[57] ABSTRACT

An empty-center rotating-roller joint with a non-segmented race (1) that has a lip (17) extending radially outward and with a U-shaped cross-section outer race (2) that encloses the lip. Two rows of rollers (11 & 12) transmit axial loads and one row (13) of rollers transmits radial loads. The rollers roll over hardened roller-contact surfaces (5, 6, 7, 8, 9, & 10) between the races. Roller-contact surfaces (8, 9, & 10) in the form of hardened wires (18, 19, and 20) are positioned against the lip of the non-segmented race (1) only. The contact surfaces of the lip of the non-segmented disk-shaped race can be hardened without the hardening process contributing to excess tension in the race. Furthermore, once the teeth on the race have been hardened, very little or no additional machining of the races will be necessary.

6 Claims, 2 Drawing Sheets

EMPTY-CENTER ROTATING-ROLLER JOINT

BACKGROUND OF THE INVENTION

The invention concerns an empty-center rotating-roller joint. Empty-center rotating-roller joints are used to transmit powerful forces from a rotating component to a stationary component in, for example, cranes, power shovels, and even tunnel drills. Diameters of several meters are common. German OS No. 2 011 141 discloses a joint of this type. The surfaces of the bearings that the surfaces of the rollers roll over are as is known hardened. When a bearing race is large, the tension or warping that occurs as the result of heat transfer and cooling during heat treatment can result in problems, especially when the unsegmented disk-shaped lip race also has hardened teeth. German Patent No. 2 734 916 addresses the problems of hardening the lip and discloses means of dealing with them. Still, the document does not suggest any solution for dealing with a lip race with hardened teeth.

SUMMARY OF THE INVENTION

The object of the present invention is accordingly to improve an empty-center rotating-roller joint of the aforesaid genus to the extent that the contact surfaces of the lip of the non-segmented disk-shaped race can be hardened without the hardening process contributing to excess tension in the race. Furthermore, once the teeth on the race have been hardened, very little or no additional machining of the races will be necessary.

Although wiring all the roller-contacted surfaces in an empty-center rotating-roller joint of the aforesaid type is known from German GM No. 1 879 514, the only purpose of so doing is to facilitate the repair of worn races. A drawback to this design is that the bearing race, with its U-shaped cross-section, is very large, which not only makes the bearing more expensive, but also leads to engineering drawbacks due to the heavy weight and hence large overall size of the adjacent components. The mechanism can accordingly not satisfy the demands of a properly functioning empty-center rotating-roller joint as disclosed in German OS No. 2 011 141.

The particular advantages of the invention are that an empty-center rotating-roller joint can be as small as a hardened bearing and that the lip on the non-segmented disk-shaped race will be simple to manufacture and reliable, especially when the race has hardened teeth. The hardened teeth will never have to be re-machined. Curving the rear of the wires convex adds the advantage that, when the bearing-contact surfaces on the U-shaped cross-section race assume a slanting or sloping position, they will not compress the edges of the rollers, preventing increased stress and resistance to torque in this situation as well. This measure allows the U-shaped cross-section race as well to be smaller, in that elastic yield can be compensated. Dividing the wires along the circumference facilitates adjusting for play and improves manufacture and assembly. Segmented bearing races also are less subject to stress in relation to curvature and to chord length.

BRIEF DESCRIPTION OF THE DRAWINGS

The drawing illustrates embodiments of the invention, which will now be described in detail.

DESCRIPTION OF THE PREFERRED EMBODIMENTS

Figure 1:
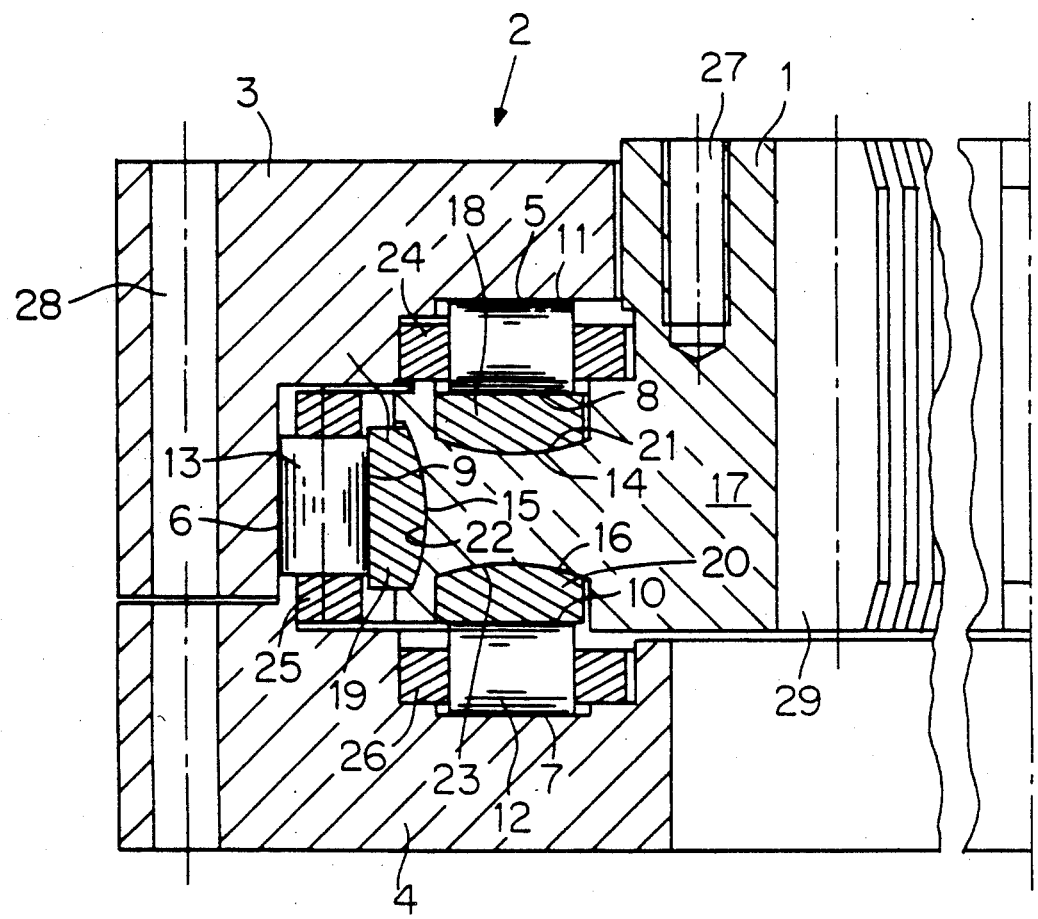
FIG. 1 is a section through half of an empty-center rotating-roller joint.
Figure 2:
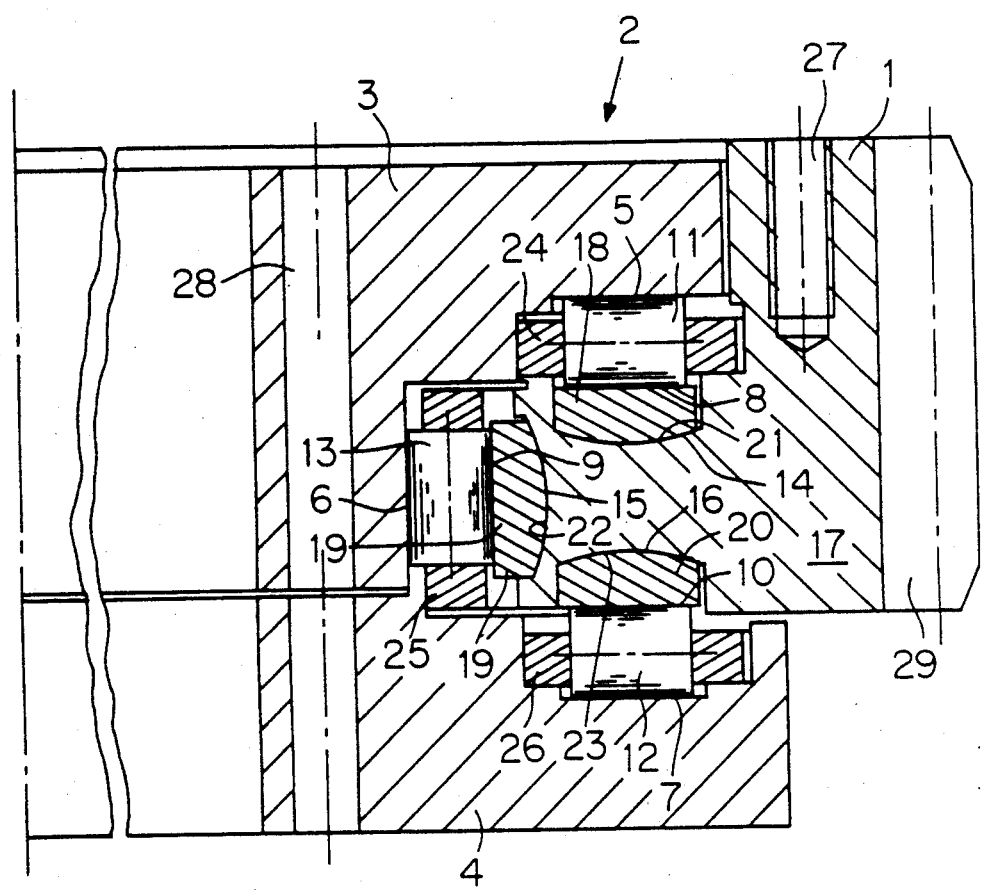
FIG. 2 is a section through half of another empty-center rotating-roller joint.

The inner race illustrated in FIG. 1 is a non-segmented race 1 and the outer race is a U-shaped cross-section race 2, whereas the outer race illustrated in FIG. 2 is a non-segmented race 1 and the inner race is a U-shaped cross-section race 2. As will be evident from FIGS. 1 and 2, the lip 17 on the non-segmented inner race 1 is enclosed in a U-shaped cross-section race 2 that consists of two disk-shaped subsidiary races 3 and 4, one resting on top of the other. Between hardened contact surfaces 5, 6, 7, 8, 9, and 10 are two rows 11 and 12 of rollers that transmit axial loads and one row 13 of rollers that transmit radial loads. Recesses 14, 15, and 16 in the lip 17 on non-segmented race 1 accommodate wires 18, 19, and 20. The rear 21, 22, and 23 of each wire is convex and rests in a matching concave recess 14, 15, and 16. The wires are preferably hardened all the way through. Rows 11, 12, and 13 extend through cages 24, 25, and 26. The rotating-roller joint is screwed to an unillustrated adjacent rotating or non-rotating component. There are for this purpose appropriate threaded bores 27 in non-segmented race 1 and bores 28 in U-shaped cross-section race 2. There are teeth 29 at the inside diameter of non-segmented race 1.

I claim:

1. An empty-center rotating roller joint comprising: a non-segmented race having a lip extending radially outward; a multiple-part outer race having a U-shaped cross-section and enclosing said lip; two rows of rollers for transmitting axial loads and one row of rollers for transmitting radial loads between said races; hardened roller-contact surfaces, said rollers rolling over said hardened roller-contact surfaces; said roller-contact surfaces comprising hardened wires inserted only at said lip of said non-segmented race, said wires being divided at least once along circumferences of said wires.

2. An empty-center rotating roller joint comprising: a non-segmented race having a lip extending radially outward; a multiple-part outer race having a U-shaped cross-section and enclosing said lip; two rows of rollers for transmitting axial loads and one row of rollers for transmitting radial loads between said races; hardened roller-contact surfaces, said rollers rolling over said hardened roller-contact surfaces; said roller-contact surfaces comprising hardened wires inserted only at said lip of said non-segmented race, said outer race with U-shaped cross-section having steel bearing rings with hardened race tracks free of race wires.

3. An empty-center rotating roller joint as defined in claim 2, wherein each wire has a rear side facing away from said rows of rollers, said lip having recesses matching said rear side for receiving said rear side.

4. An empty-center rotating roller joint as defined in claim 3, wherein said rear side of each wire has a convex shape, said recesses in said lip being concave shaped to match and receive said rear side of each wire.

5. An empty-center rotating roller joint as defined in claim 2, wherein at least one race is a multiple-part race.

6. An empty-center rotating roller joint as defined in claim 2, wherein said outer race is segmented.

* * * * *